(12) United States Patent
Beal

(10) Patent No.: US 6,515,375 B1
(45) Date of Patent: Feb. 4, 2003

(54) ADAPTIVE WAVE MOTION ELECTRICAL POWER GENERATOR

(75) Inventor: Terrence E. Beal, Portsmouth, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 1 day.

(21) Appl. No.: 09/912,657

(22) Filed: Jul. 25, 2001

(51) Int. Cl.[7] ............................................. F03B 13/10
(52) U.S. Cl. ................................... 290/42; 290/53
(58) Field of Search .......................... 290/53, 42, 43, 290/54

(56) References Cited

U.S. PATENT DOCUMENTS

| 4,742,241 A | * | 5/1988 | Melvin | 290/42 |
| 4,781,023 A | * | 11/1988 | Gordon | 290/42 |
| 4,996,840 A | * | 3/1991 | Marx | 60/398 |
| 5,510,656 A | * | 4/1996 | Wells | 290/42 |
| 5,986,349 A | * | 11/1999 | Eberle | 290/53 |

* cited by examiner

Primary Examiner—Nestor Ramirez
Assistant Examiner—Nguyen Hanh
(74) Attorney, Agent, or Firm—Michael J. McGowan; Michael F. Oglo; James M. Kasischke

(57) ABSTRACT

An adaptive wave motion electrical power generation method and system are provided. An alternator, floating freely at a water's surface, has magnet and wire coil structures that undergo relative movement therebetween in response to wave motion at or near the water's surface thereby causing electric current to flow through the wire coil structure. Dynamic parameters (e.g., relative acceleration, velocity or displacement) describing the relative movement between the magnet and wire coil structures are measured. Also measured are the electric current flowing through the wire coil structure and voltage thereacross. The amount of electric current flowing in the wire coil structure and delivered to the load is controlled based on the dynamic parameters.

25 Claims, 1 Drawing Sheet

ADAPTIVE WAVE MOTION ELECTRICAL POWER GENERATOR

STATEMENT OF GOVERNMENT INTEREST

The invention described herein may be manufactured and used by or for the Government of the United States of America for Governmental purposes without the payment of any royalties thereon or therefor.

CROSS-REFERENCE TO RELATED PATENT APPLICATIONS

Not applicable.

BACKGROUND OF THE INVENTION (1) Field of the Invention

The present invention relates generally to the generation of electrical power using wave motion, and more particularly to a wave motion electrical generator that adaptively adjusts itself to efficiently deliver electrical power to a load regardless of the amplitude or frequency of wave motion.

(2) Description of the Prior Art

The use of ocean wave motion in electrical power generation is known in the art. Such power generation is frequently used as a means to operate electronic systems or recharge a battery of a device operating at sea. In general, the power generation is achieved as wave motion causes relative movement between a magnet and a coil of wire. As a result, electric current is induced in the wire coil. Examples of such power generation systems are disclosed in U.S. Pat. Nos. 3,546,473 and 4,539,485. The problems associated with these systems include the need to tether the system to a fixed reference such as the ocean floor and the inability of the systems to maximize their power generation efficiency in varying wave conditions.

SUMMARY OF THE INVENTION

Accordingly, it is an object of the present invention to provide an electrical power generator system.

Another object of the present invention is to provide an electrical power generator system that uses wave motion as a motive force and that adapts itself to varying wave conditions to control and/or maximize power generation for a given application.

Still another object of the present invention is to provide an electrical power generator system that is free floating thereby allowing its use with untethered underwater vehicles and systems.

Other objects and advantages of the present invention will become more obvious hereinafter in the specification and drawings.

In accordance with the present invention, an adaptive wave motion electrical power generation method and system are provided for maximizing and controlling the amount of electrical power delivered to a load. An alternator, floating freely at a water's surface, has magnet and wire coil structures that undergo relative movement therebetween in response to wave motion at or near the water's surface. As a result of such relative movement, electric current flows through the wire coil structure. Dynamic parameters describing the relative movement between the magnet and wire coil structures are measured. Also measured are the electric current flowing through the wire coil structure and voltage thereacross. The amount of electric current flowing in the wire coil structure and delivered to the load is controlled based on the dynamic parameters. As a result, electrical power delivered to the load and the relative movement between the magnet and wire coil structures are controlled. To maximize the electrical power delivered to the load, one current control method involves the minimization of a ratio defined by one of the dynamic parameters (e.g., relative acceleration, velocity or displacement measurements between the magnet and wire coil structures) to the electrical power.

BRIEF DESCRIPTION OF THE DRAWINGS

Other objects, features and advantages of the present invention will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
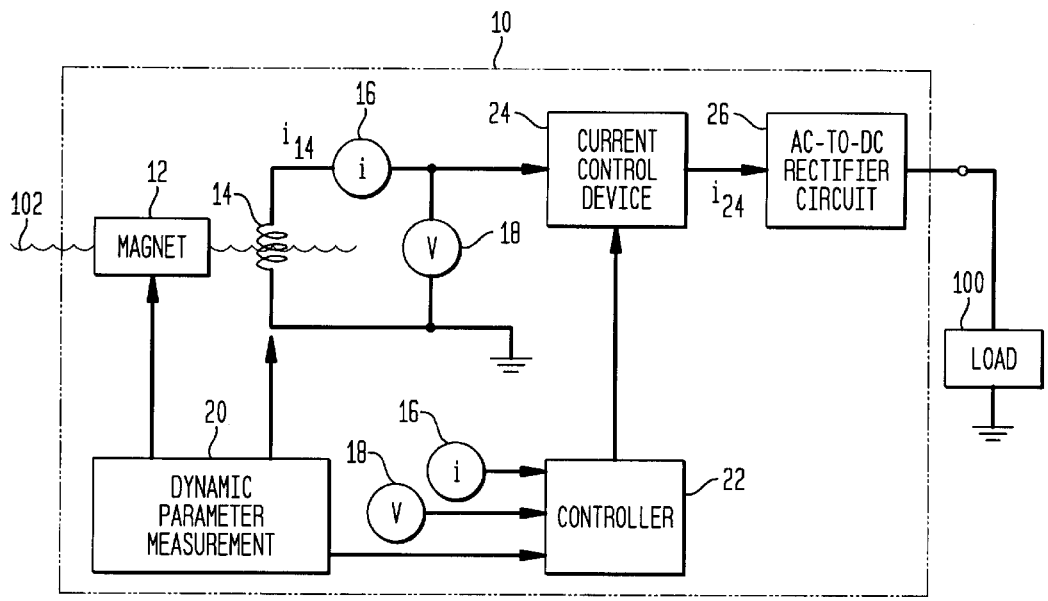
FIG. 1 is a schematic diagram of an adaptive wave motion electrical power generator system according to an embodiment of the present invention.

Referring now to the drawings, and more particularly to FIG. 1, an adaptive wave motion electrical power generator system according the present invention is contained within dashed-line box referenced by numeral 10. Generator system 10 is designed to positioned as a free-floating autonomous power generator for use in the open ocean, sea or rivers at the surface thereof. Generator system 10 is coupled to a load 100 which can be a rechargeable battery(ies) or any other device/system requiring electrical power. It is to be understood, therefore, that the choice of water venue and load 100 are not limitations of the present invention.

The portion of generator system 10 that converts wave motion to electric energy is provided by a linear alternator consisting of a magnet structure 12 and a wire coil structure 14 capable of floating at a water's surface 102. Both magnet structure 12 and wire coil structure 14 are untethered. That is, they are both freely-floating at (or near) water surface 102 so that both freely experience surface wave motion occurring at or near water surface 102.

Resulting relative movement between structures 12 and 14 generates an electric current that flows through wire coil structure 14. The remaining elements of generator system 10 control this electric current in a novel fashion to control the electrical power delivered to load 100. By way of illustrative example, the present invention will be described for the situation where it is desired to maximize the electrical power delivered to load 100 in changing wave conditions. Thus, the present invention is adaptive to maximize its electrical power supply regardless of the amount of wave activity.

Generator system 10 includes an adaptive control loop coupled to the linear alternator defined by structures 12 and 14. The control loop includes current and voltage measurement units 16 and 18, respectively, for measuring current flow in wire coil structure 14 and voltage thereacross. The control loop further includes dynamic parameter measurement unit 20 coupled to structures 12 and 14 for measuring one or more dynamic parameters that describe the relative movement between structures 12 and 14. These dynamic parameters can include acceleration, velocity and displacement of each of magnet structure 12 and wire coil structure 14. It is to be understood that the particular devices/methods used to obtain these parameters is not a limitation of the present invention. By way of example, accelerometers could be used to measure acceleration and integrators could be used to provide corresponding velocity (i.e., single integration of acceleration) and displacement (i.e., double integration of acceleration).

Measurement units 16, 18 and 20 supply inputs to a controller 22 which processes the inputs in accordance with a desired function such as maximizing electrical power to load 100 as in the illustrative example. Controller 22 issues a control signal to a current control device 24 which can be operated to control the amount of current that can flow therethrough. Such current control devices are well known in the art and will not be described further herein.

The current to be controlled by device 24 is the generated current $i_{14}$ flowing through wire coil structure 14 and the controlled amount of current is designated as $i_{24}$. Thus, controlling the amount of output current $i_{24}$ effectively controls the amount of current $i_{14}$ flowing through wire coil structure 14.

Since generated current $i_{14}$ is an alternating current (AC), it may be necessary to rectify this current to DC if required by load 100. Accordingly, if needed, an AC-to-DC rectifier circuit 26 can be coupled between current control device 24 and load 100.

Generator system 10 can be incorporated in a variety of sea-going systems. By way of example, generator system 10 could be included on board an unmanned underwater vehicle (UUV) having a rechargeable battery(ies) as load 100. When the battery needed to be recharged, the UUV would surface and assume the configuration illustrated in FIG. 2.

Figure 2:
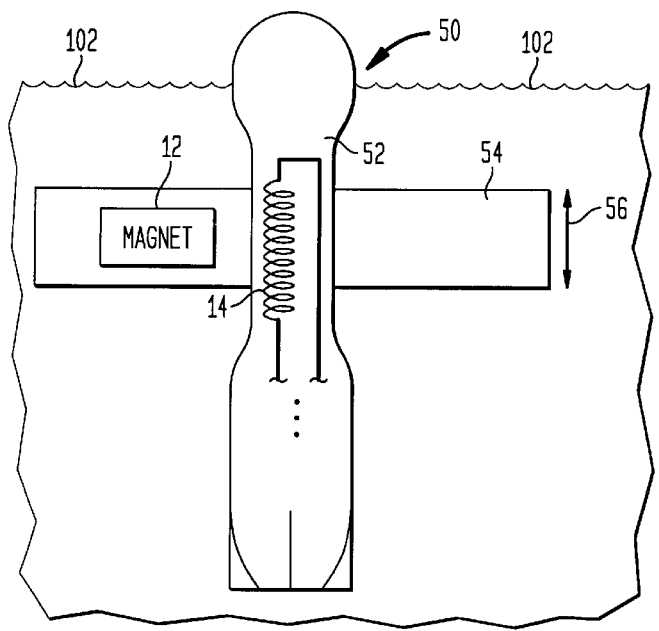
FIG. 2 is a schematic illustration of an unmanned underwater vehicle (UUV) in a free-floating configuration for utilizing the generator system of the present invention.

In FIG. 2, a UUV 50 has a body 52 housing wire coil structure 14 and a flotation collar 54 housing magnet structure 12. The remaining elements of generator system 10 described above are omitted from FIG. 2 for clarity of illustration. Collar 54 can be disposed about body 52. Collar 54 is coupled to body 52 such that it can travel or ride up and down on body 52 with wave motion to produce relative movement therebetween as indicated by two-headed arrow 56. As described above, such relative movement 56 produces the electric current in wire coil structure 14.

Referring now simultaneously to FIGS. 1 and 2, the control principles of the present invention will be described. In general, an electromagnetic force F results from wire coil structure 14 moving through the magnetic fields of magnet structure 12. Force F is a function of magnetic flux B generated by magnet structure 12, the total length "l" of wire in wire coil structure 14 moving through flux B, and the current induced in the wire coil structure or $i_{14}$ as indicated in FIG. 1. Specifically, $$F = Bli_{14} \qquad (1)$$

Therefore, using current control device 24 to increase or decrease its current output also controls the electromagnetic force F acting between collar 54 and body 52 to effectively control the relative movement therebetween.

The voltage V generated across wire coil structure 14 (and measured by measuring unit 18) is a function of magnetic flux B, the total length l of wire as described above, and the relative velocity v of collar 54 with respect to body 52. Specifically, $$V = Blv \qquad (2)$$

Using equations (1) and (2), it can be shown that reducing current $i_{14}$ in wire coil structure 14 causes an increase in relative velocity v thereby increasing induced voltage V. As velocity v increases, the relative displacement between collar 54 and body 52 also increases.

Using the above described general information, a control method can be derived (for use by controller 22) to, for example, maximize the electrical power (i.e., $Vi_{14}$) delivered to load 100. One control method for maximizing the electrical power involves minimizing a ratio. The ratio to be minimized is defined by either relative acceleration, velocity or displacement between magnet structure 12 and wire coil structure 14 as compared to electrical power delivered to load 100 or $Vi_{14}$. The absolute acceleration, velocity and/or displacement of magnet structure 12 and wire coil structure 14 are measured at measuring unit 20. The relative acceleration, velocity and/or displacement parameters can be determined at unit 20 or controller 22 to provide the needed relative quantities.

After minimizing this ratio and determining the current $i_{14}$ that should be associated therewith, controller 22 issues a control signal to current control device 24 to correspondingly permit/restrict current flow in wire coil structure 14. As a result of the current control, relative movement between magnet structure 12 and wire coil structure 14 is also controlled as indicated by equation (1). By constantly minimizing the above-described ratio, the present invention automatically adapts itself to provide a maximum electrical power to load 100 in any wave conditions.

The advantages of the present invention are numerous. Electrical power can be generated in a free-floating structure thereby making the present invention useful as an energy source/recharger for autonomous sea-going vehicles or free-floating structures. The present invention automatically adapts itself to changing wave conditions to, for example, maximize the electrical power delivered to a load.

Figure 3:
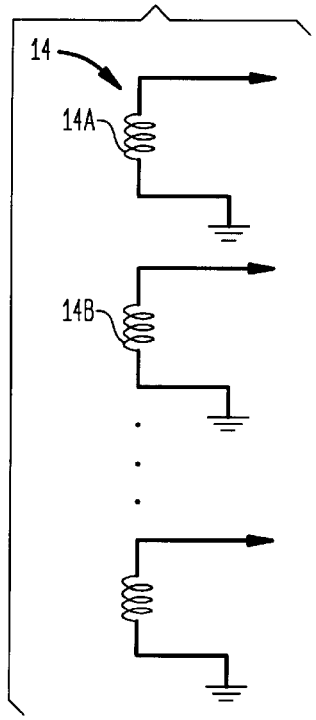
FIG. 3 is an alternative embodiment of a wire coil structure utilizing a plurality of independent wire coils.

Although the present invention has been described relative to a specific embodiment thereof, it is not so limited. For example, wire coil structure 14 could be configured as a plurality of wire coils 14A, 14B, etc. as illustrated in FIG. 3, with each coil providing a portion of the current that will be controlled by the present invention. Further, the control method carried out by controller 22 could be a control function other than maximizing electrical power to load 100. Thus, it will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An adaptive wave motion electrical power generator system for maximizing and controlling the amount of electrical power delivered to a load, comprising:

an alternator floating freely at a water's surface, said alternator having magnet and wire coil structures that undergo relative movement therebetween in response to wave motion at or near the water's surface, wherein electric current flows through said wire coil structure as a result of said relative movement;

measuring means coupled to said alternator for measuring dynamic parameters describing said relative movement between said magnet and wire coil structures, and for measuring said electric current and voltage across said wire coil structure; and current control means coupled to said alternator and said measuring means for controlling an amount of said electric current flowing in said wire coil structure and delivered to the load based on said dynamic parameters wherein electrical power delivered to the load and said relative movement are controlled.

2. An adaptive wave motion electrical power generator system as in claim 1, wherein said wire coil structure is coupled to an underwater vehicle, and wherein said magnet structure is coupled to a float, said float being coupled to said underwater vehicle to undergo said relative movement.

3. An adaptive wave motion electrical power generator system as in claim 2, wherein said float is formed as a collar disposed about said underwater vehicle.

4. An adaptive wave motion electrical power generator system as in claim 1, wherein said wire coil structure comprises a plurality of wire coils, each of said plurality of wire coils producing a portion of said electric current.

5. An adaptive wave motion electrical power generator system as in claim 1, wherein said electric current is an AC current, said system further comprising and AC-to-DC rectifier circuit coupled between said current control means and the load for converting said AC current to DC.

6. An adaptive wave motion electrical power generator system as in claim 1, wherein said current control means is configured to have a primary function, said primary function being to maximize said electrical power.

7. An adaptive wave motion electrical power generator system for maximizing the amount of electrical power delivered to a load, comprising:
  an alternator floating freely at a water's surface, said alternator having magnet and wire coil structures that undergo relative movement therebetween in response to wave motion at or near the water's surface, wherein electric current flows through said wire coil structure as a result of said relative movement;
  measuring means coupled to said alternator for measuring a motion descriptive parameter associated with said relative movement between said magnet structure and said wire coil structure, and for measuring said electric current and voltage across said wire coil structure, wherein electrical power delivered to the load is the product of said electric current and said voltage; and
  current control means coupled to said alternator and said measuring means for maximizing said electrical power by minimizing a ratio defined by said motion descriptive parameter to said electrical power.

8. An adaptive wave motion electrical power generator system as in claim 7, wherein said wire coil structure is coupled to an underwater vehicle, and wherein said magnet structure is coupled to a float, said float being coupled to said underwater vehicle to undergo said relative movement.

9. An adaptive wave motion electrical power generator system as in claim 8, wherein said float is formed as a collar disposed about said underwater vehicle.

10. An adaptive wave motion electrical power generator system as in claim 7, wherein said wire coil structure comprises a plurality of wire coils, each of said plurality of wire coils producing a portion of said electric current.

11. An adaptive wave motion electrical power generator system as in claim 7, wherein said electric current is an AC current, said system further comprising and AC-to-DC rectifier circuit coupled between said current control means and the load for converting said AC current to DC.

12. An adaptive wave motion electrical power generator system as in claim 7, wherein said motion descriptive parameter is relative acceleration between said magnet structure and said wire coil structure.

13. An adaptive wave motion electrical power generator system as in claim 7, wherein said motion descriptive parameter is relative velocity between said magnet structure and said wire coil structure.

14. An adaptive wave motion electrical power generator system as in claim 7, wherein said motion descriptive parameter is relative displacement between said magnet structure and said wire coil structure.

15. A method for maximizing and controlling the amount of electrical power delivered to a load using wave motion, comprising the steps of:
  floating an alternator at a water's surface, said alternator having magnet and wire coil structures that can undergo relative movement therebetween in response to wave motion at or near the water's surface, wherein electric current flows through said wire coil structure as a result of said relative movement;
  measuring dynamic parameters describing said relative movement between said magnet and wire coil structures;
  measuring said electric current and voltage across said wire coil structure; and
  controlling an amount of said electric current flowing in said wire coil structure and delivered to the load based on said dynamic parameters wherein electrical power delivered to the load and said relative movement are controlled.

16. A method according to claim 15, further comprising the steps of:
  coupling said wire coil structure to an underwater vehicle;
  coupling said magnet structure to a float; and
  coupling said float to said underwater vehicle to undergo said relative movement.

17. A method according to claim 16, further comprising the step of disposing said float as a collar about said underwater vehicle.

18. A method according to claim 15, wherein said electric current is an AC current, said method further comprising the step of converting said AC current to DC prior to delivery to the load.

19. A method for maximizing the amount of electrical power delivered to a load using wave motion, comprising the steps of:
  floating an alternator at a water's surface, said alternator having magnet and wire coil structures that can undergo relative movement therebetween in response to wave motion at or near the water's surface, wherein electric current flows through said wire coil structure as a result of said relative movement;
  measuring a motion descriptive parameter associated with said relative movement between said magnet structure and said wire coil structure;
  measuring said electric current and voltage across said wire coil structure, wherein electrical power delivered to the load is the product of said electric current and said voltage; and
  minimizing a ratio defined by said motion descriptive parameter to said electrical power.

20. A method according to claim 19, further comprising the steps of:
  coupling said wire coil structure to an underwater vehicle;
  coupling said magnet structure to a float; and
  coupling said float to said underwater vehicle to undergo said relative movement.

21. A method according to claim 20, further comprising the step of disposing said float as a collar about said underwater vehicle.

22. A method according to claim 19, wherein said electric current is an AC current, said method further comprising the step of converting said AC current to DC prior to delivery to the load.

23. A method according to claim 19, wherein said motion descriptive parameter is relative acceleration between said magnet structure and said wire coil structure.

24. A method according to claim 19, wherein said motion descriptive parameter is relative velocity between said magnet structure and said wire coil structure.

25. A method according to claim 19, wherein said motion descriptive parameter is relative displacement between said magnet structure and said wire coil structure.

* * * * *